(12) United States Patent
Salam et al.

(10) Patent No.: US 10,050,842 B2
(45) Date of Patent: Aug. 14, 2018

(54) NETWORK CONTROL AND MANAGEMENT USING SEMANTIC REASONERS IN A NETWORK ENVIRONMENT

(71) Applicant: CISCO TECHNOLOGY, INC., San Jose, CA (US)

(72) Inventors: Samer Salam, Vancouver (CA); Eric A. Voit, Bethesda, MD (US); Ludwig Alexander Clemm, Los Gatos, CA (US); Edward Albert Warnicke, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 670 days.

(21) Appl. No.: 14/339,312

(22) Filed: Jul. 23, 2014

(65) Prior Publication Data

US 2016/0026631 A1 Jan. 28, 2016

(51) Int. Cl.
*G06F 17/30* (2006.01)
*H04L 12/24* (2006.01)

(52) U.S. Cl.
CPC ........ *H04L 41/145* (2013.01); *H04L 41/0803* (2013.01); *H04L 41/16* (2013.01)

(58) Field of Classification Search
CPC ............. G06F 12/0813; G06F 13/4286; G06F 9/3867; G06F 2212/154; G06F 17/3087; G06F 17/30598; G06F 9/30054
See application file for complete search history.

(56) References Cited

U.S. PATENT DOCUMENTS

| 8,209,599 | B2 | 6/2012 | Vion-Dury et al. | |
|---|---|---|---|---|
| 8,725,774 | B2 | 5/2014 | Meunier et al. | |
| 8,909,771 | B2* | 12/2014 | Heath | G06Q 30/02 |
| | | | | 705/39 |
| 9,323,938 | B2* | 4/2016 | Glazier | G06F 8/10 |
| 2004/0139095 | A1* | 7/2004 | Trastour | H04L 67/02 |

(Continued)

OTHER PUBLICATIONS

Clemente, et al., "Semantic Web-Based Management of Routing Configurations," Journal of Network Systems and Management, vol. 19, Issue 2, pp. 209-229, Jun. 2011.

(Continued)

*Primary Examiner* — Angelica Ruiz

(57) ABSTRACT

An example method for facilitating network control and management using semantic reasoners in a network environment is provided and includes generating a fully populated semantics model of the network from network data according to a base network ontology of the network, mapping the fully populated semantics model to a network knowledge base, feeding contents of the network knowledge base to a semantic reasoner, and controlling and managing the network using the semantic reasoner. In specific embodiments, generating the model includes receiving the network data from the network, parsing the network data, loading the parsed network data into in-memory data structures, accessing a manifest specifying binding between a network data definition format and ontology components of the base network ontology, identifying ontology components associated with the network data based on the manifest, and populating the identified ontology components with individuals and properties from the corresponding data structures.

15 Claims, 8 Drawing Sheets

(56) References Cited

U.S. PATENT DOCUMENTS

| | | | | |
|---|---|---|---|---|
| 2006/0248045 | A1* | 11/2006 | Toledano | G06F 17/30463 |
| 2008/0162109 | A1* | 7/2008 | Strassner | G06F 17/2247 704/1 |
| 2008/0168017 | A1* | 7/2008 | Sreedhar | G06F 8/10 706/47 |
| 2009/0320093 | A1* | 12/2009 | Glazier | G06F 8/10 726/1 |
| 2011/0022560 | A1* | 1/2011 | Breiter | G06N 5/04 706/47 |
| 2011/0208689 | A1* | 8/2011 | Chakraborty | G06N 5/022 706/59 |
| 2013/0275345 | A1 | 10/2013 | Shironoshita | |
| 2013/0290241 | A1 | 10/2013 | Taylor et al. | |

OTHER PUBLICATIONS

"HermiT OWL Reasoner—The New Kid on the OWL Block," Information Systems Group, Department of Computer Science, University of Oxford, Jun. 2013, 2 pages; http://hermit-reasoner.com.

Horrocks, et al., "SWRL: A Semantic Web Rule Language Combining OWL and RuleML," W3C Member Submission May 21, 2004; 49 pages; http://www.w3org/Submission/SWRL/Overview.html.

"Infrastructures Materielles et Logicielles Pour La Societe Numerique (INFRA) 2013: project DISCO," ANR The French National Research Agency, Projects for Science, Reference Project ANR-13-INFR-0013, Jan. 2014, 3 pages http://www.agence-nationale-recherche.fr/en/anr-funded-project.

Kodeswaran, et al., "Enforcing Security in Semantics Driven Policy Based Networks," Journal of Computer Standards and Interfaces, vol. 33 Issue 1, pp. 2-12, Jan. 2011.

Kodeswaran, et al., "Utilizing Semantic Policies for Secure BGP Route Dissemination," Tech Report, Sep. 27, 2007, 5 pages http://ebiquity.umbc.edu/paper/html/id/376/Utilizing-Semantic-Policies-for-Secure-BGP-Route-Dissemination.

"Pellet: OWL 2 Reasoner for Java," Clark & Parsia, LLC, © 2005-2013 Clark & Parsia LLC. All Rights Reserved. Published on or about Nov. 19, 2007; 3 pages http://clarkparsia.com/pellet/.

Smith, et al., "OWL Web Ontology Language Guide," W3C Recommendation Feb. 10, 2004; 72 pages; http://www.w3.org/TR/owl-guide.

* cited by examiner

NETWORK CONTROL AND MANAGEMENT USING SEMANTIC REASONERS IN A NETWORK ENVIRONMENT

TECHNICAL FIELD

This disclosure relates in general to the field of communications and, more particularly, to network control and management using semantic reasoners in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating network control and management using semantic reasoners in a network environment is provided and includes generating a fully populated semantics model of the network from network data according to a base network ontology of the network, mapping the fully populated semantics model to a network knowledge base, feeding contents of the network knowledge base to a semantic reasoner, and controlling and managing the network using the semantic reasoner. In specific embodiments, generating the model includes receiving the network data from the network, parsing the network data, loading the parsed network data into in-memory data structures, accessing a manifest specifying binding between a network data definition format and ontology components of the base network ontology, identifying ontology components associated with the network data based on the manifest, and populating the identified ontology components with individuals and properties from the corresponding data structures.

As used herein, a "semantics model" comprises a conceptual data model (e.g., description of objects represented by computer readable data including a map of concepts and their relationships) in which semantic information is included. The semantics model describes the meaning of its instances, thereby allowing, without human intervention, expression of meaning in any information exchange based on the model. In particular, the semantics model of a network includes a knowledge representation of the network consisting of a framework of semantically related terms. The knowledge representation may include, for example, a directed or undirected graph consisting of vertices (which represent concepts, such as network devices, interfaces, etc.) and edges (which represent the relations between the concepts). As used herein, the term "semantic reasoner" comprises a software and/or hardware (e.g., application specific integrated circuits, field programmable gate arrays, etc.) able to infer logical consequences from a set of asserted facts and/or axioms.

Example Embodiments

Figure 1:
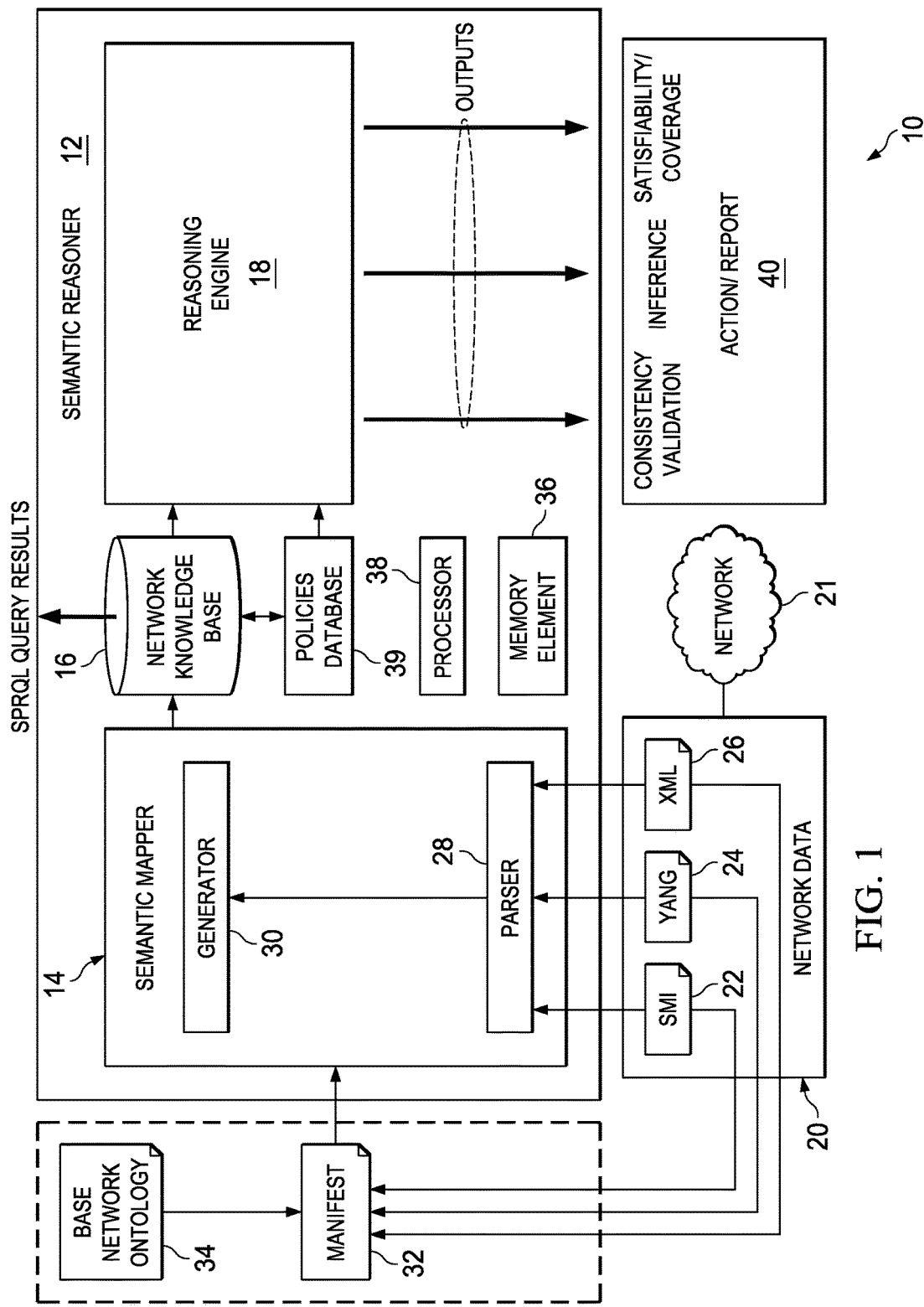
FIG. 1 is a simplified block diagram illustrating a communication system for facilitating network control and management using semantic reasoners in a network environment.

Turning to FIG. 1, FIG. 1 is a simplified block diagram illustrating a communication system 10 for facilitating network control and management using semantic reasoners in a network environment in accordance with one example embodiment. FIG. 1 illustrates a communication system 10 comprising a semantic reasoner 12 comprising a semantic mapper 14, a network knowledge base (NKB) 16, and a reasoning engine 18. Network data 20 from a network 21 may be fed into semantic reasoner 12 in any suitable format, for example (without limitation), Structure of Management Information (SMI) 22, YANG 24, or Extensible Markup Language (XML) 26. According to various embodiments, a parser sub-module 28 and a generator sub-module 30 in semantic mapper 14 may dynamically and automatically populate NKB 16 with data extracted from network data 20 using a manifest 32 according to a base network ontology 34. A memory element 36 and a processor 38 may facilitate the various operations performed by semantic reasoner 12. Reasoning engine 18 may perform machine reasoning on content in NKB 16, for example, using policies and rules from a policies database 39, and generate action(s) or report(s) 40 appropriate for controlling and managing network 21. Note that action/report 40 may include any suitable action or report, including remedial action and reports, notification actions and informational reports.

In a general sense, an ontology formally represents knowledge as a hierarchy of concepts within a domain (e.g., a network), using a shared vocabulary to denote types, properties and interrelationships of the concepts. In particular, a "base network ontology" (e.g., 34) of a network (e.g., 21) comprises an explicit representation of a shared conceptualization of the network, providing a formal structural framework for organizing knowledge related to the network as a hierarchy of inter-related concepts. The shared conceptualizations include conceptual frameworks for modeling domain knowledge (e.g., knowledge related to the network, content specific protocols for communication among devices and applications within the network, etc.); and agreements about representation of particular domain theories. In a general sense, base network ontology 34 may be encoded in any suitable language, such as Web Ontology Language (OWL).

As used herein, the term "manifest" refers to a list of bindings (e.g., mappings) between a data definition format (e.g., SMI version 2 (SMIv2), YANG, XML, etc.) and ontology components. In some embodiments, manifest 32 may be relatively static in nature, and may be developed based on the associated base network ontology 34 and SMI/YANG/XML, etc. of network data 20 being mapped. As base network ontology 34 evolves (e.g., is updated), manifest 32 may be updated accordingly (e.g., by a human operator).

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In today's complex Information Technology (IT) environments, network operation involves managing and reasoning over large volumes of data that span at least the following broad categories: —(1) business rules that dictate overall system behavior and outcomes; (2) policy definitions that govern connectivity patterns and control-plane operation; (3) device configurations that are subject to software and/or hardware capabilities and limitations; and (4) operational soft-state data including routing tables, statistics, etc. that can be used for Big Data analytics. Whereas multiple network management and operations, administration and management (OAM) tools exist, network operation continues to be a high-touch task that requires human involvement to interpret the data or configure policies based on technical or business contexts.

Software defined networking (SDN) promises to reduce human involvement by having applications declare their intent programmatically to controllers, and the latter drive the operation of the network. Integral to the success of SDN is network management and control logic with the ability to reason over various network data categories. Such reasoning involves detecting policy violations; reconciling between conflicting policy definitions; detecting unintended consequences and reverting to stable state; and inferring network configuration based on intent and contextual information, among other features. The reasoning can be mechanized using semantic technologies, including ontology languages (e.g., Web Ontology Language (OWL), OWL-Descriptions Logics (OWL-DL), resource description framework (RDF), Semantic Web Rule Language (SWRL), etc.); ontology editors (e.g., Protege); semantic frameworks (e.g., Sesame); and semantic reasoners (e.g., Pellet, HermiT, FaCT++, etc.).

The semantic web stack comprises a stack of several components: XML provides an elemental syntax for content structure within documents, yet associates no semantics with the meaning of the content contained within; RDF is a simple language for expressing data models (e.g., referring to objects ("web resources") and their relationships), which can be represented in a variety of syntaxes, e.g., RDF/XML; RDF Schema extends RDF and is a vocabulary for describing properties and classes of RDF-based resources, with semantics for generalized-hierarchies of such properties and classes; OWL adds more vocabulary for describing properties and classes (e.g., relations such as disjointness, cardinality, equality, etc. between classes, richer typing of properties, characteristics of properties (e.g. symmetry), enumerated classes); SPARQL is a protocol and query language for querying semantic web data sources; and RIF is the W3C Rule Interchange Format for expressing Web rules that computers can execute. A unifying logic can be built over the querying, ontologies and rules to provide a semantic web interface.

An existing semantic approach for policy based networking uses border gateway protocol (BGP) with semantic information (e.g., associated with routes) expressed in a Web Ontology Language (OWL) ontology. Policies are expressed using Semantic Web Rules Language (SWRL) to provide fine-grained control where the routers can reason over their routes and determine how the routes are to be changed. The semantic approach uses BGP extensions to carry semantic information in route attributes. A BGP ontology expressed in OWL together with SWRL rules define the routing policy. A reasoner acts over the ontology and rules to generate the router's BGP configuration (e.g. route import/export rules). However, the semantic approach does not provide any suitable mechanisms for mapping the operational and configuration data on the device to the ontology.

Currently, tools exist that perform semantic reasoning across objects having properties. There are also approaches to migrate an XML dataset into an ontological domain for use by a semantic reasoner. Some tools apply a semantic reasoner to resource relationships such as links between XML documents. In a general sense, such semantic technologies, including artificial intelligence (AI), knowledge representation and description logics and semantic formalisms, are applied to the semantic web, which provides a common framework that allows data to be shared and reused across application, enterprise and community boundaries. The collection, structuring and recovery of linked data are enabled by the semantic technologies, which provide a formal description of concepts, terms, and relationships within a given knowledge domain, to allow semantic annotation of data and enable machine reasoning over the data. As such, the semantic technologies are not currently used for network control and/or management.

Communication system 10 is configured to address these issues (among others) to offer a system and method for facilitating network control and management using semantic reasoners in a network environment. According to various embodiments, semantic mapper 14 in semantic reasoner 12 may automatically (e.g., without human intervention) map network data 20 to network knowledge base 16, network data 20 being modeled according to base network ontology 34. The contents of network knowledge base 16 may be fed to reasoning engine 18, which may control and manage network 21 appropriately. In various embodiments, base network ontology 34 and manifest 32 may be generated manually (e.g., with programmer input), whereas semantic reasoner 12 may operate substantially automatically (e.g., without programmer input). In other embodiments, base network ontology 34 and manifest 32 may be generated semi-automatically, for example, with minimal human intervention.

In various embodiments, base network ontology 34 can include a scope of network 21, devices in network 21, and individual protocols and features that run on the devices. Base network ontology 34 may specify concepts (e.g., classes), relationship between concepts (e.g., object properties), data properties (e.g., literals) and individuals (e.g., instances of classes). In a general sense, base network ontology 34 can function as a dictionary for mapping network data 20 into a specific semantic model of network 21. A combination of W3C Web Ontology Language Descriptive Logics (OWL-DL) and W3C Semantic Web Rules Language (SWRL) can be used to define ontologies (e.g., base network ontology 34) capable of declaratively defining facts, policies and rules that govern networking technologies (e.g., associated with network 21) and specify what conditions are true or false for a given 'intent' (e.g., policy, goal, etc.) to hold. Some or all of the policies and rules may be stored separately in policies database 39.

Intent specifications can be expressed in terms of SWRL rules, which use high-level concepts defined in a set of ontologies, thus making the intent specification generic, device-independent and extensible. Meta-policies may be specified for guiding interactions among intents. For example, meta-policies may be used to prioritize intents when multiple intents are applicable in a context. A meta-level vocabulary can define constructs for resolving conflicting overlapping intents. For example, the meta-level vocabulary can be used to create a default conflict resolution rule such that a prohibitive policy overrides permissive policy. The meta-level vocabulary also allows for defining absolute and relative prioritization of intents, thus overriding the default rule. The meta-policies define an automatic conflict resolution diagnosis to respond to situations when intents presented to a network impose conflicting conditions on the overall infrastructure or on one specific network element.

In various embodiments, modeling network data 20 may involve receiving network data 20 at semantic mapper 14. In a general sense, semantic mapper 14 may comprise a portion of an application (e.g., software tool or service) that aids in transformation of data elements from one namespace (e.g., SMI, YANG, or XML) into another namespace (e.g., OWL-DL). Parser 28 in semantic mapper 14 may parse network data 20 and load the parsed network data 20 into in-memory data structures, which can include Java classes. Generator 30 may access manifest 32 specifying binding between network data types and base network ontology 34. Generator 30 may generate a fully populated semantics model from the data structures using manifest 32 and network data values. Thus, according to various embodiments, communication system 10 can facilitate developing a semantic model of network 21. Network data 20 available within network 21 may be projected onto the semantic models.

In some embodiments, the fully populated semantics model may comprise an OWL-DL file(s), which may be saved into NKB 16. In various embodiments, NKB 16 may comprise mined network data 20 that has been projected against base network ontology 34 (which may be defined by various authorities, such as a plurality of organizations, persons, domains, departments, etc.). In various embodiments, NKB 16 may be written using OWL-DL and SWRL. According to various embodiments, NKB 16 can be configured as any suitable database, table, array, data structure, etc. that allows reasoning engine 18 to access NKB 16 and perform reasoning operations thereon. In some embodiments, NKB 16 comprises an OWL-DL ontology with classes, subclasses, properties and instances representing network 21. NKB 16 can act as a centralized database of information in some embodiments, permitting search queries to be run on the contents therein. In a general sense, NKB 16 comprises a machine readable tangible non-transitory medium for storing information in any suitable format. In various embodiments, NKB 16 can comprise a dynamic storehouse of information, capable of learning and updating network related information associated with network 21.

According to various embodiments, reasoning engine 18 may perform machine reasoning over network data 20 in network knowledge base 16 and make inferences suitable for controlling and managing network 21. In various embodiments, the machine reasoning may be according to pre-configured rules and policies, for example, in policies database 39. At least some rules, policies and meta-policies in policies database 39 may be external to base network ontology 34 and accordingly not part of the semantics model in NFB 16. The external rules, policies and meta-policies may be input by a user, administrator, etc. Some of the rules, policies and meta-policies may be particular (e.g., proprietary) to a provider of network 21 in some embodiments; some of the rules, policies and meta-policies may be common among all network providers in other embodiments.

In an example embodiment, reasoning engine 18 comprises an artificial intelligence (AI) engine that uses network data 20 and user defined policies for the management and control of network 21. In particular embodiments, reasoning engine 18 may operate over NKB 16 and provide basic reasoning functions available with Descriptive Logics (DL), such as consistency checking, inference and concept coverage (e.g., satisfiability verifications). The reasoning can be used to control and manage network 21 appropriately. For example, reasoning engine 18 may trigger generation of action(s) and/or report(s) 40 that can cause changes in network configuration, alert human operators, and otherwise facilitate controlling and managing network 21.

In an example embodiment, reasoning engine 18 can detect if any of network data 20 is inconsistent based on rules specified in base network ontology 34, and trigger a suitable action. For example, policies database 39 indicates a rule from base network ontology 34 that interfaces on distinct routers are distinct in their virtual routing and forwarding instance (VRF) and IP address combination across the network. Assume that network 21 includes two interfaces, on distinct routers, where interfaces are the same. Reasoning engine 18 may instantiate the rule with the data about the interface instances and flags that an inconsistency is found. Thus, reasoning engine can automatically detect that two interfaces configured on two distinct routers with the same virtual routing and forwarding instance (VRF) and same IP address, and trigger corrective action based on preset rules (such as pick the next available IP address in the subnet) in policies database 39.

Reasoning engine 18 can also infer logical consequences based on a set of asserted facts and/or axioms. For example, reasoning engine 18 may detect that a particular router's control plane is being subjected to a denial of service attack from a given source IP, based on examining traffic statistics and central processing unit (CPU)/memory utilization and trigger, for instance, installation of an access control list (ACL) to filter traffic from that malicious source.

In some embodiments, reasoning engine 18 can solve a concept coverage problem (CCoP), for example, for service composition and resource identification. For example, reasoning engine 18 can identify paths available from source A to destination B that do not traverse a specific autonomous system. In another example, reasoning engine 18 can determine whether a specific route to a destination prefix leaves political borders of Canada, etc. Reasoning engine 18 can trigger a report back of a degree of deviation between a request and current state of the network. In an example embodiment, reasoning engine 18 can determine whether an application's intent is satisfiable in an SDN context given the current state of the network, and if not, can trigger a report back of the 'semantic distance' (e.g., degree of divergence) between the intent and the current state.

Additionally, reasoning engine 18, running on a central server or embedded in one or more network elements within or outside network 21, can use meta-information to automatically merge intents from multiple controllers and generate a target configuration that meets the combined requirements. As used herein, the term 'network element' is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In some embodiments, reasoning engine 18 may be embodied in one or more instances executing on one or more network elements within or outside network 21.

The one or more reasoning engine 18 instances may follow the semantics defined by the policy language. Consequently, the steps in merging policies can be formally verified using a logical model. To combine multiple intents, the semantic language can depend on open-world assumption reasoning (e.g., in an open-world assumption reasoning, "positive" assertions may be made; absence of an assertion does not mean the absent assertion is false). In such open-world assumption reasoning, NKB 16 may be incrementally developed, and is not required to be complete to be useful. In such embodiments, communication system 10 may cause rules to be evaluated by the knowledge contained within NKB 16. For example, such restrictions can allow reasoning engine 18 to yield a solution in a finite time. By utilizing semantic technologies to drive the framework, it may be possible to realize dynamic reconfiguration of knowledge as new facts can be inferred through the policies specified. Any suitable tool may be used to drive the ontology specification of base network ontology 34, reasoning engine 18, etc. to build and deploy embodiments of communication system 10 on a large scale.

In various embodiments, complexity of the policy specification mechanism can be relevant to ease of its acceptance. A declarative policy language that enables each authority to draft abstract policies in a high-level language can be a good candidate for policy specification. Each authority can define only those objectives and constraints that are relevant to its needs. The information expressed by the policy language can be defined in a manner that is as hardware, software, and protocol independent as possible. Therefore, according to embodiments of communication system 10, authorities need not focus on writing procedures for configuring a specific network infrastructure; instead they can focus on describing a generic infrastructure and its features without needing to master and understand the various device/protocol/system specific mechanisms. The semantic reasoning elements of semantic reasoner 12 can convert substantially any specified policy into device specific configurations.

Embodiments of communication system 10 can provide a method and apparatus for building semantic NKB 16 using semantic mapper 14, which takes as input user-defined base network ontology 34, a set of SMI/YANG/XML comprising network data 20, and generates a fully populated OWL-DL ontology represented as a semantic model that can be acted upon by reasoning engine 18, to achieve at least the following: —consistency checking of network and device operation and configuration (e.g., detecting and remedying overlapping IP address assignment); inference of states or consequences based on a set of facts (e.g., detecting denial of service attacks and isolating the malicious source); verifying the satisfiability of a concept (e.g. in SDN context, verifying whether an application's intent is satisfiable given the state of the network).

Embodiments of communication system 10 can enable embedding artificial intelligence in network 21, through semantic reasoner 18, either on the network elements themselves or on an SDN controller. One of the advantages that can be realized with embodiments of communication system 10 may include automatic generation of NKB 16 from network data 20 (e.g., in form of SMI/YANG modules/XML files) using as input base network ontology 34, which can describe basic rules and principles of networking, and formally describe business rules and advanced policies of the network. Additionally, embodiments of communication system 10 can be applied across substantially all network technologies and protocols (e.g., Layer 2, Layer 3, etc.). Embodiments of communication system 10 may also provide a mechanism for performing machine reasoning over network Big Data.

Turning to the infrastructure of communication system 10, the network topology of network 21 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy;

the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, semantic reasoner 12 can comprise a software application executing using processor 38 and memory element 36. In some embodiments, semantic reasoner 12 may be instantiated on a server comprising memory element 36 and processor 38. In other embodiments, semantic reasoner 12 may be instantiated on another network element comprising memory element 36 and processor 38. In yet other embodiments, semantic reasoner 12 may comprise a stand-alone appliance including memory element 36 and processor 38, connected to the network, and operable to execute various operations as described herein. In yet other embodiments, semantic reasoner 12 may comprise a distributed application, with different elements (e.g., semantic mapper 14, NKB 16, reasoning engine 18) instantiated on separate physical or virtual machines.

Figure 2:
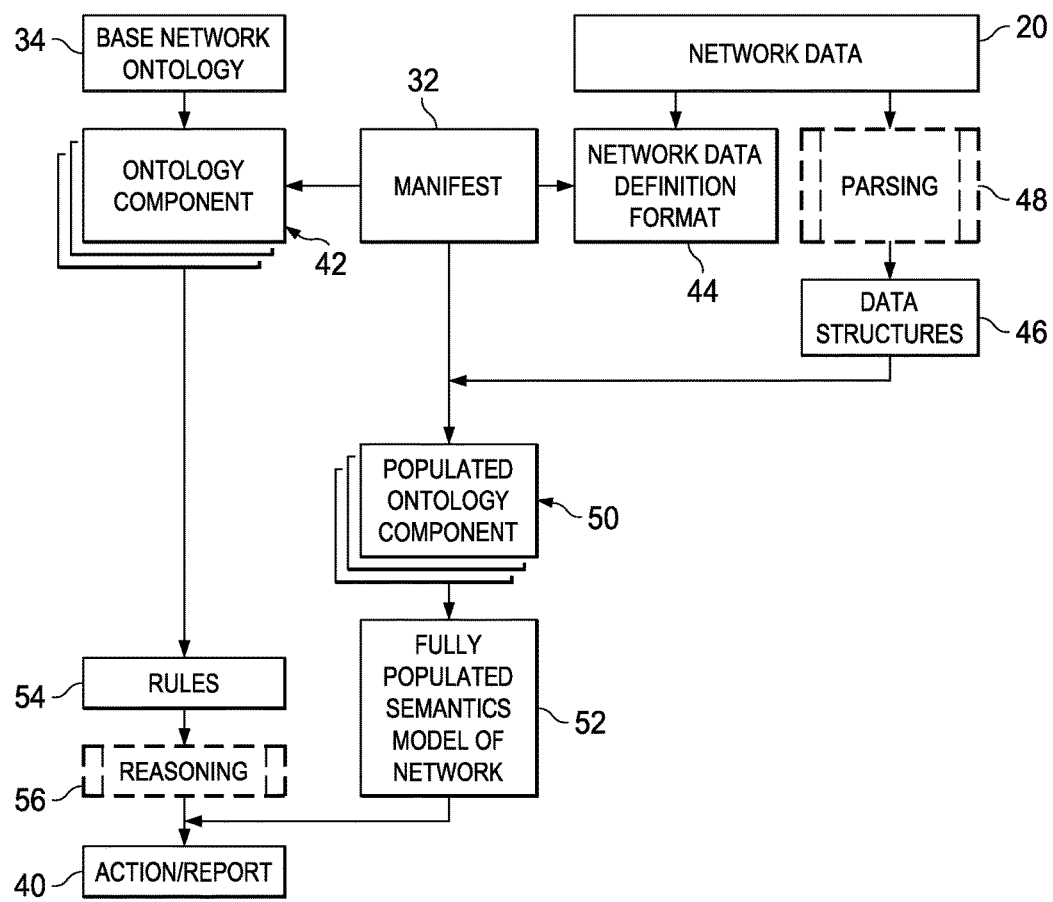
FIG. 2 is a simplified block diagram illustrating other example details of embodiments of the communication system.

Turning to FIG. 2, FIG. 2 is a simplified block diagram illustrating example details of an embodiment of communication system 10. In a general sense, base network ontology 34 may represent network 21 and can entail a set of classes; each class represents a concept; and there is a set of relationships among the classes. An instantiation of a class is referred to as an individual (of that class). Base network ontology 34 includes a plurality of ontology components 42, which can include: individuals (e.g., instances and objects that form a basic unit of the ontology; examples include interfaces, devices, links, etc.); classes (e.g., also called type, sort, category and kind, referring to groups, sets, and collections of objects, and also refer to abstract objects defined by values of aspects that are constraints for being a member of the class); attributes (e.g., aspects, properties, features, characteristics, or parameters that objects (and classes) can have); relations (e.g., ways in which classes and individuals can be related to one another); function terms (e.g., complex structures formed from certain relations); restrictions (e.g., formally stated descriptions of what must be true in order for some assertion to be accepted as input); rules (e.g., antecedent-consequent statements that describe logical inferences that can be drawn from an assertion); axioms (e.g., assertions (including rules) in a logical form that together comprise the overall theory that the ontology describes in its domain of application); and events (e.g., changing of attributes or relations).

Manifest 32 may provide a binding between ontology components 42 and a network data definition format 44 of network data 20. Examples of bindings specified by manifest 32 can include: mapping a SMI managed object, YANG leaf or XML element to OWL-DL class to which an individual belongs; mapping a SMI object hierarchy, YANG leafref or XML element hierarchy to an OWL-DL object property asserted over a pair of individuals; mapping a value of a SMI object, YANG leaf or XML element to an OWL-DL individual of a corresponding class; and asserting a data property on an individual.

During operation, network data 20 may be parsed into one or more data structures 46, for example, using parsing operation 48. Data structures 46 may include specifications and properties of various network features in particular network data definition formats (e.g., SMI, YANG modules, XML schema, etc.). SMIv2 and YANG comprise model definition languages that can describe the base network ontology model "in the abstract;" XML (similar to JSON, or ASN.1 BER) is a transfer syntax for an instantiated network model. Specific ontology components 42 indicated by data structures 46 may be identified using manifest 32. Populated ontology components 50 may be generated with individuals and properties from data structures 46 populated into corresponding ontology component 42. Populated ontology components 50 may be assembled to generate a fully populated semantics model 52. Rules and policies 54 from ontology component 42 may be used to reason (56) over fully populated semantics model 52, and action/report 40 may be generated appropriately.

Figure 3:
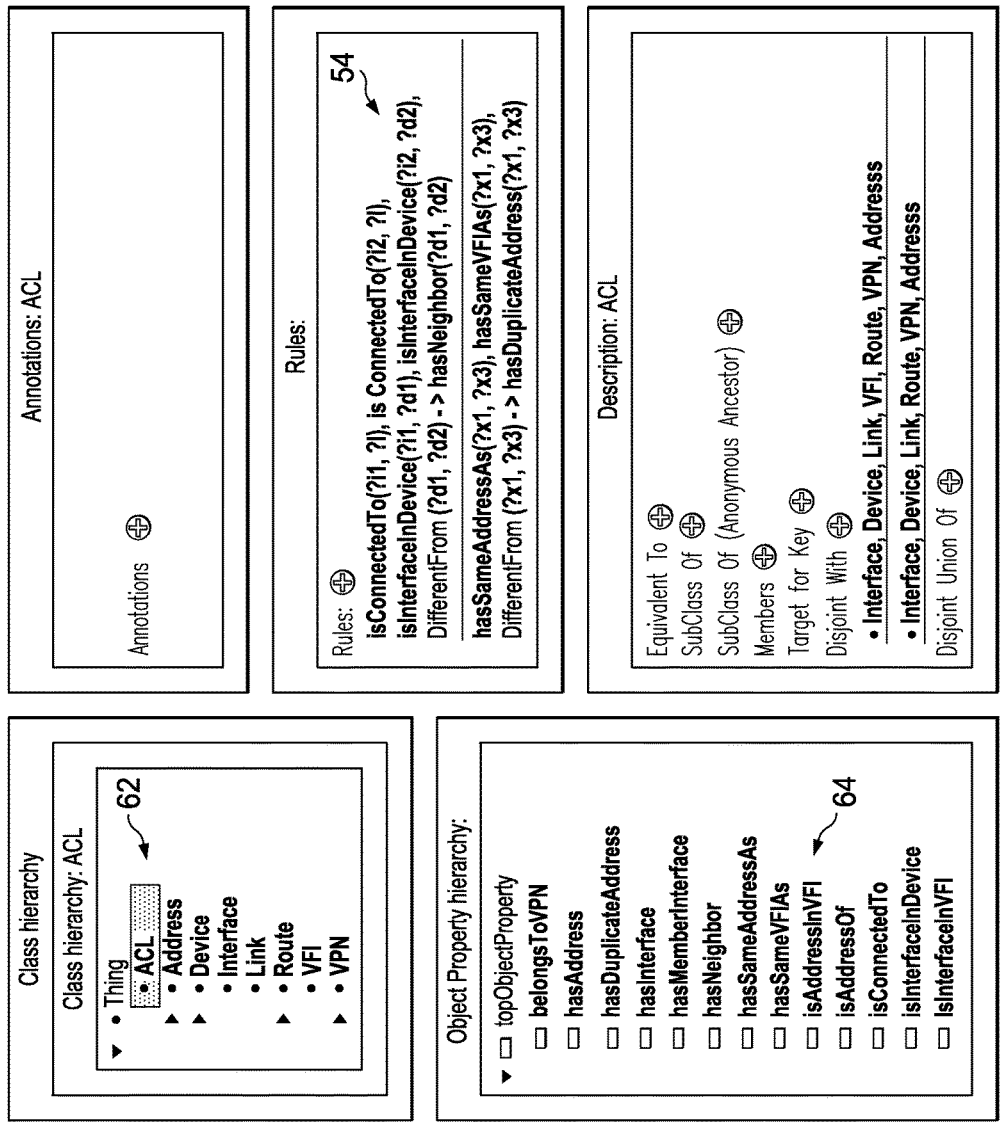
FIG. 3 is a simplified block diagram illustrating yet other example details of embodiments of the communication system.

Turning to FIG. 3, FIG. 3 is a simplified block diagram illustrating example details of an embodiment of communication system 10. In various embodiments, knowledge associated with networking technology may be captured in the form of base network ontology 34. An appropriate user interface 60 may facilitate user generation of base network ontology 34. For example, individual(s) 62 of base network ontology 34 may be specified appropriately to include (by way of examples and not limitations) devices, routes, addresses, virtual private network (VPN), interfaces, links, and virtual forwarding interfaces. Each individual 62 may be associated with one or more properties 64. Properties 64 may link individual(s) 62 together. For example, an <interface> individual may be associated with a property that specifies an <address> individual (e.g., <interface> has Address <address>). Properties 64 may be chained together, specified according to a hierarchy, or otherwise combined in any suitable manner to specify relationships (if any) between various individuals 62. For example, a "neighbor" property may be specified, which may be derived from a pair of <interface> individuals being connected over the same <link> individual. In another example, two <interface> individuals in the same <VRF> individual may be specified with the same <address> value. Further, rules and policies 54 may be specified as appropriate, for example, to define complex properties (e.g., neighbor property), invalid conditions (e.g., duplicate IP addresses on two different interfaces), etc.

Figure 4:
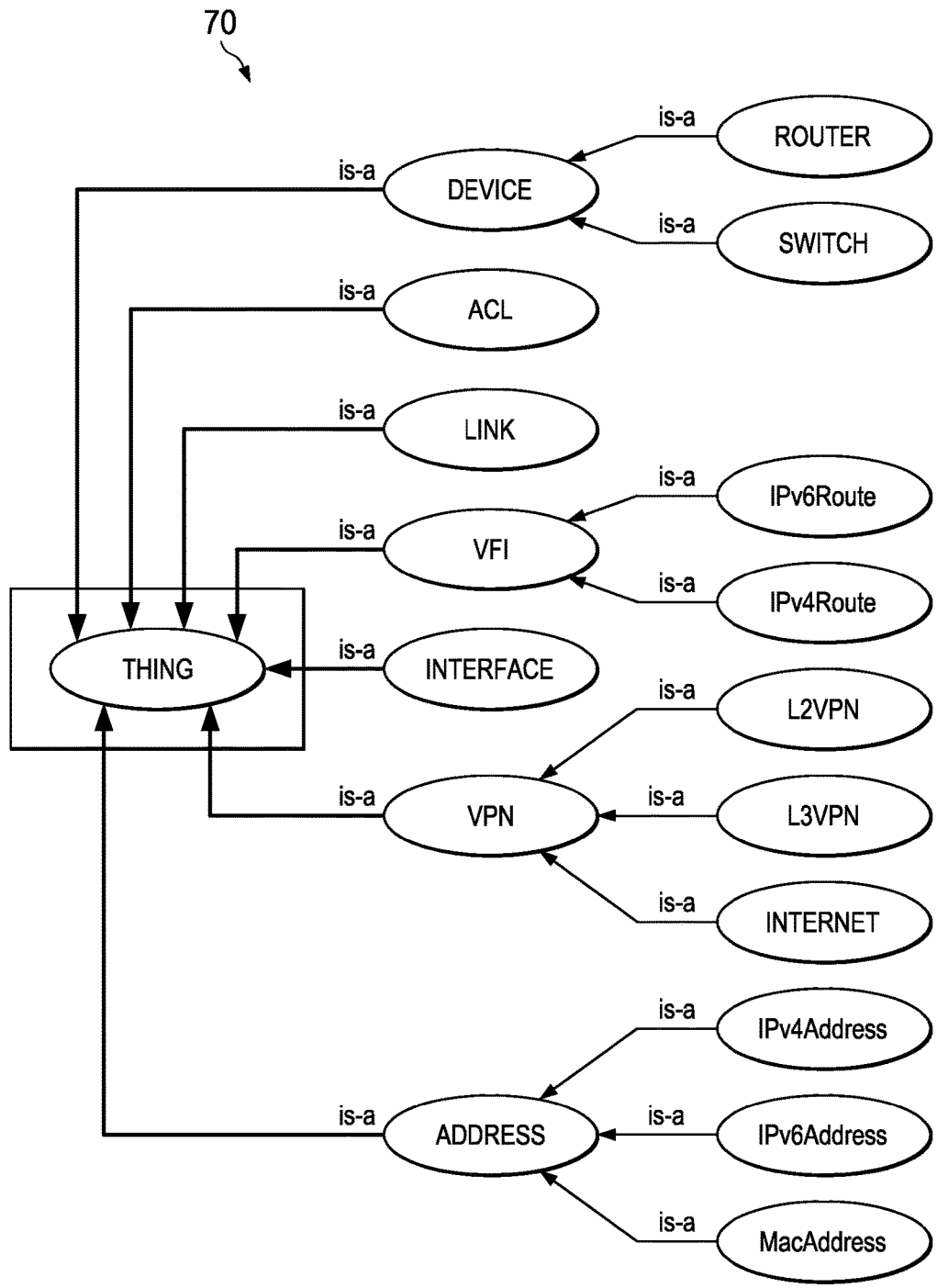
FIG. 4 is a simplified block diagram illustrating yet other example details of embodiments of the communication system.

Turning to FIG. 4, FIG. 4 is a simplified block diagram illustrating an example semantic model 70 of network 21 according to an embodiment of communication system 10. For example, a router and a switch may be specified as sub-classes of a <device> thing (e.g., concept, class); an IPv6 route may be specified as a sub-class of a <route> thing. Each class may be specified as a vertex on the graph, with the edges representing the semantic relationship (e.g., "is-a" relationship).

Figure 5A:
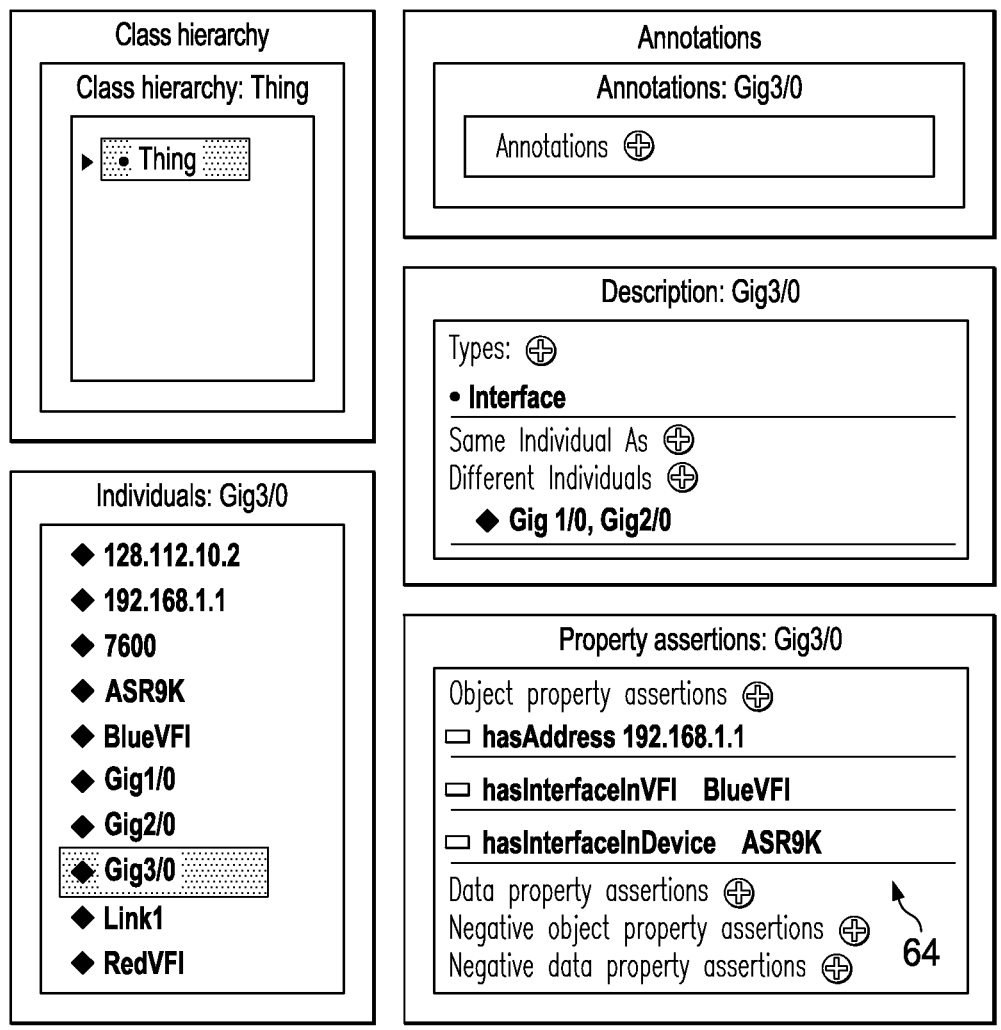
FIG. 5A is a simplified block diagram illustrating yet other example details of embodiments of the communication system.
Figure 5B:
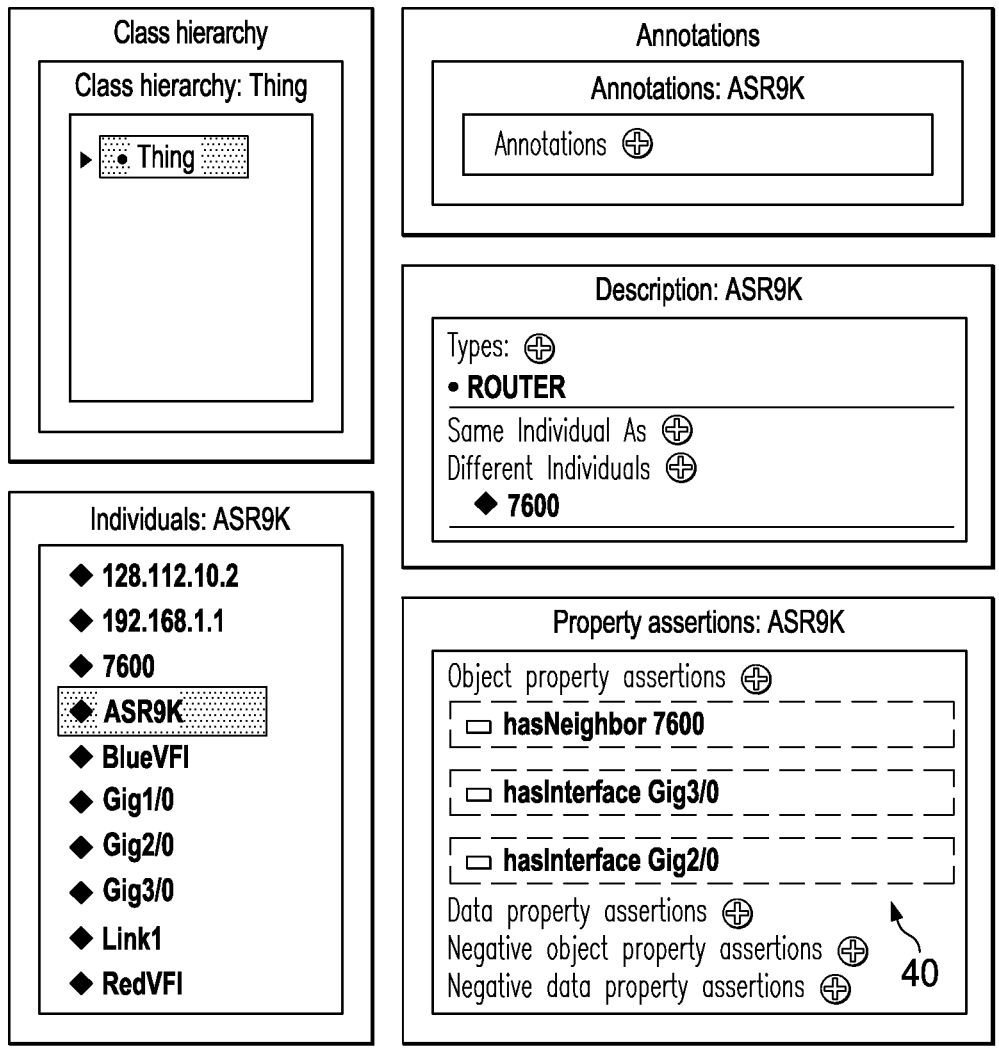
FIG. 5B is a simplified block diagram illustrating yet other example details of embodiments of the communication system.

Turning to FIGS. 5A and 5B, FIGS. 5A and 5B are simplified block diagrams illustrating an example user interface 72 that may be used to operate semantic reasoner 12. Assume, merely for the sake of illustration, and not as a limitation, that several individuals are defined as follows: (1) two <address> individuals: 128.112.10.2 and 192.168.1.1; (2) two <router> individuals: 7600 and ASR9K; (3) two <VFI> individuals: red and blue; (4) three <interface> individuals: Gig1/0 has address 192.168.1.1, assigned to 7600 and blue VFI; Gig2/0 has address 128.112.10.2, assigned to ASR9K and red VFI; Gig3/0 has address 192.168.1.1, assigned to ASR9K and blue VFI; (5) and <link> individuals has two interfaces Gig1/0 and Gig2/0. Note that the individual definitions and possible properties 64 maybe defined using base network ontology 34; actual values populated therein may be obtained from fully populated semantic model 52, saved into NKB 16. Reasoning engine 18 may be executed on fully populated semantic model 52 to deduce logical consequences based on rules and object properties. Reasoning engine 18 may generate action/report 40 (see FIG. 5B) based on deducing that 7600 is a neighbor of ASR9K and other facts.

Figure 6:
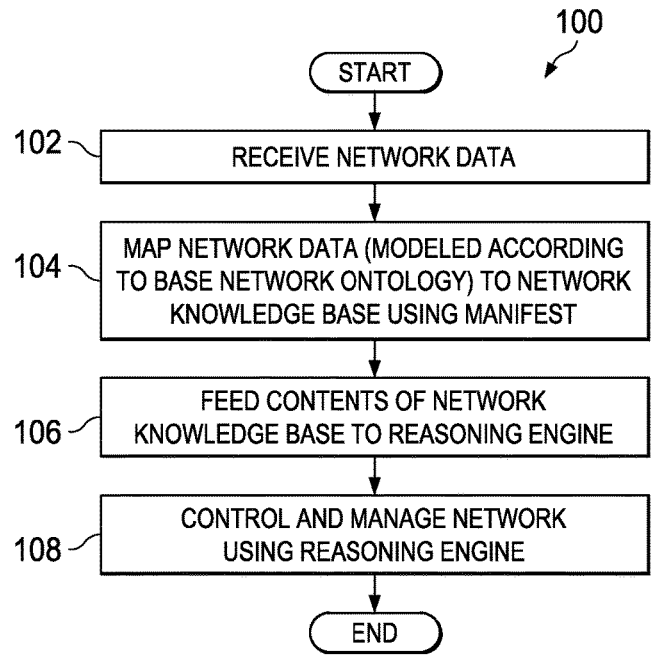
FIG. 6 is a simplified flow diagram illustrating example operations that may be associated with embodiments of the communication system.

Turning to FIG. 6, FIG. 6 is a simplified flow diagram illustrating example operations 100 that may be associated with embodiments of communication system 10. At 102, semantic reasoner 18 may receive network data 20 (e.g., in the format of SMI, YANG, XML, etc.). At 104, semantic mapper 14 may map network data 20 (modeled according to base network ontology 34) to NKB 16 using manifest 32. At 106, semantic mapper 14 may feed contents of NKB 16 to reasoning engine 18. At 108, semantic reasoner 12 may control and manage network 21 using reasoning engine 18.

Figure 7:
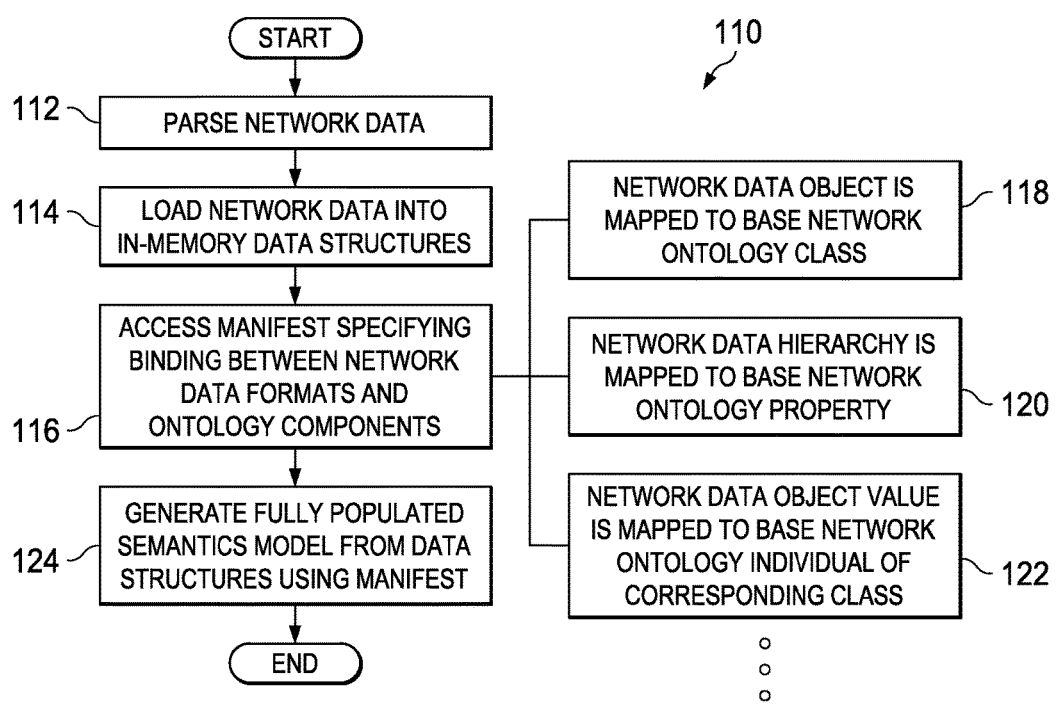
FIG. 7 is a simplified flow diagram illustrating other example operations that may be associated with embodiments of the communication system.

Turning to FIG. 7, FIG. 7 is a simplified flow diagram illustrating example operations 110 that may be associated with embodiments of communication system 10. At 112, parser 28 may parse network data 20. At 114, parser 28 may load parsed network data 20 into data structures 46. At 116, generator 30 may access manifest 32 specifying binding between network data definition formats 44 and ontology components 42. For example, the binding may specify a mapping of a network data object to a base network ontology class (118); the binding may specify a mapping of a network data hierarchy to a base network ontology property (120); the binding may specify a mapping of a network data object value to a base network ontology individual of a corresponding class (122), etc. Note that various appropriate bindings not illustrated in the figure may be specified within the broad scope of the embodiments. At 124, generator 28 may generate fully populated semantics model 52 from data structures 46 using manifest 32.

Figure 8:
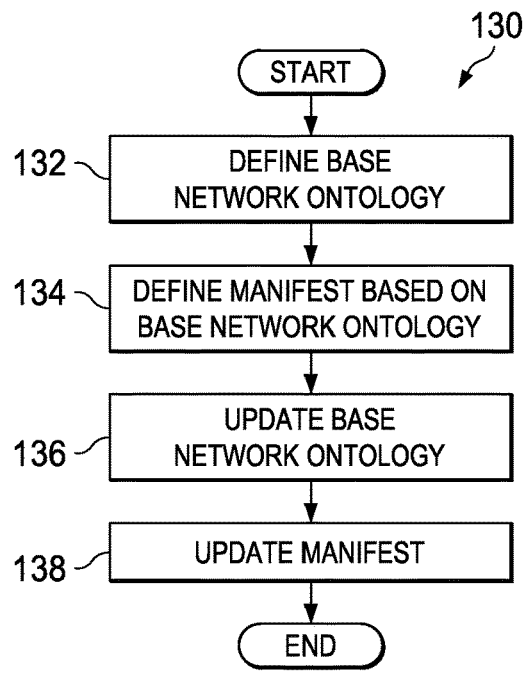
FIG. 8 is a simplified flow diagram illustrating yet other example operations that may be associated with an embodiment of the communication system.

Turning to FIG. 8, FIG. 8 is a simplified flow diagram illustrating example operations 130 that may be associated with embodiments of communication system 10. At 132, base network ontology 34 may be defined (e.g., using programmer input). At 134, manifest 32 based on base network ontology 34 may be defined (e.g., using programmer input). At 136, base network ontology 34 may be updated (e.g., to accommodate new aspects of network 21). At 138, manifest 32 may be updated accordingly.

Figure 9:
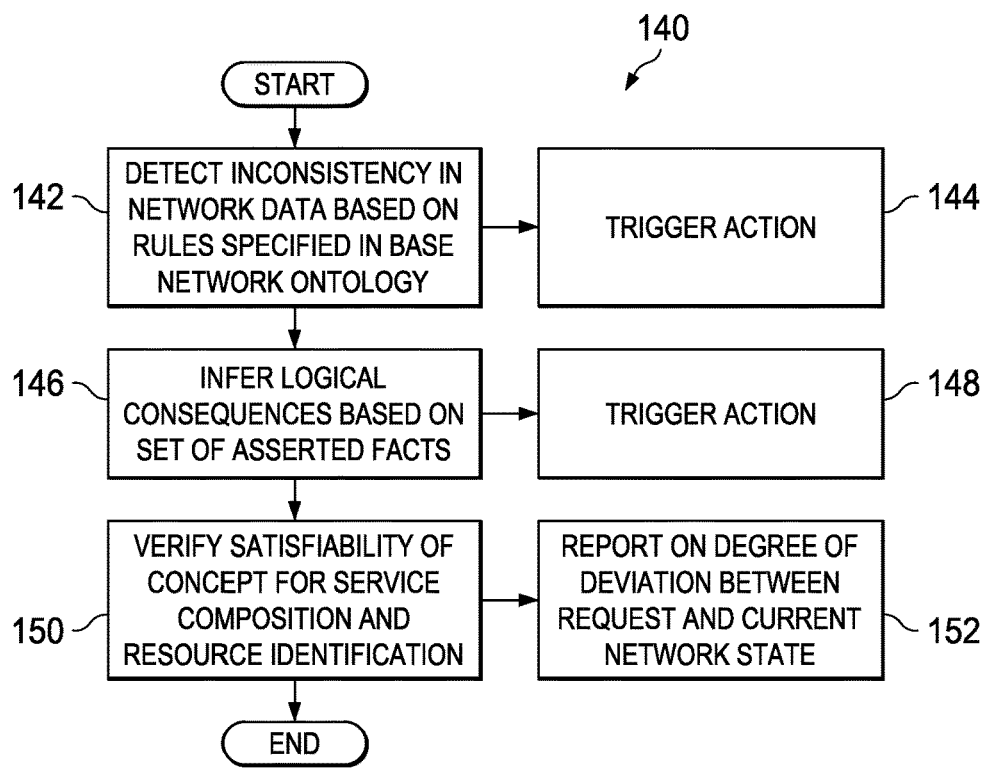
FIG. 9 is a simplified flow diagram illustrating yet other example operations that may be associated with an embodiment of the communication system.

Turning to FIG. 9, FIG. 9 is a simplified flow diagram illustrating example operations 140 that may be associated with embodiments of communication system 10. At 142, an inconsistency in network data 20 based on rules and policies 54 specified in base network ontology 34 may be detected. At 144, a suitable action may be triggered. At 146, logical consequences based on set of asserted facts in fully populated semantics model 52 may be inferred. At 148, another suitable action may be triggered. At 150, satisfiability of a concept for service composition and resource identification may be verified. At 152, a suitable report on degree of deviation between request and current state of network 21 may be generated. Note that the operations outlines in the figure may be performed in any appropriate sequence without departing from the scope of the embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, semantic reasoner 12. In some embodiments, one or more of these features may be implemented in hardware, provided external to these elements, or consolidated in any appropriate manner to achieve the intended functionality. The various network elements (e.g., semantic reasoner 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, semantic reasoner 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 36) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 38) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing and sequence of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a semantic reasoner in a computer network, comprising:
   generating a fully populated semantics model of the computer network from network data according to a base network ontology of the computer network, wherein the semantics model comprises a representation of the computer network in a framework of semantically related terms comprising properties of network features of components of the computer network;
   automatically mapping the fully populated semantics model to a network knowledge base;
   feeding contents of the network knowledge base to a reasoning engine; and
   controlling and managing the network using the reasoning engine,
   wherein generating the fully populated semantics model of the network comprises:
     receiving the network data from the network;
     parsing the network data;
     loading the parsed network data into in-memory data structures;
     accessing a manifest specifying binding between a network data definition format and ontology components of the base network ontology;
     identifying ontology components associated with the network data based on the manifest;
     populating the identified ontology components with individuals and properties from the corresponding data structures,
   wherein the network data definition format comprises a selection from a group consisting of Structure of Management Information (SMI), YANG, and Extensible Markup Language ( XML); and
   wherein the manifest comprises:
     mapping of at least one of SMI managed object, YANG leaf and XML element to a Web Ontology Language Description Logics (OWL-DL) class to which an individual belongs;
     mapping of at least one of SMI object hierarchy, YANG leafref and XML element hierarchy to an OWL-DL object property asserted over a pair of individuals;
     mapping of a value of at least one of SMI object, YANG leaf and XML element to an OWL-DL individual of a corresponding class; and
     asserting a data property on an individual.

2. The method of claim 1, wherein the base network ontology includes scope of the network, devices in the network, and individual protocols and features that run on the devices, wherein the base network ontology specifies concepts, relationship between concepts, data properties and individuals.

3. The method of claim 1, wherein the manifest is updated when the base network ontology is updated.

4. The method of claim 1, further comprising performing machine reasoning over the network data in the network knowledge base using the reasoning engine.

5. The method of claim 4, wherein the machine reasoning may be according to pre-configured rules and policies.

6. The method of claim 1, wherein controlling and managing the network comprises:
   detecting inconsistency in network data based on rules specified in the base network ontology, wherein an appropriate action is triggered upon detecting the inconsistency;
   inferring logical consequences based on a set of asserted facts, wherein another appropriate action is triggered when an error is inferred; and
   verifying satisfiability of a concept for service composition and resource identification, wherein a report on degree of deviation between a request and current network state is generated if the concept's satisfiability is not verified.

7. The method of claim 1, wherein the contents of the network knowledge base includes OWL-DL ontology files.

8. Non-transitory tangible media that includes instructions for execution, which when executed by a processor in a computer network, is operable to perform operations comprising:
   generating a fully populated semantics model of the computer network from network data according to a base network ontology of the computer network, wherein the semantics model comprises a representation of the computer network in a framework of semantically related terms comprising properties of network features of components of the computer network;
   mapping the fully populated semantics model to a network knowledge base;
   feeding contents of the network knowledge base to a semantic reasoner; and
   controlling and managing the network using the semantic reasoner,
   wherein generating the fully populated semantics model of the network comprises:
      receiving the network data from the network;
      parsing the network data;
      loading the parsed network data into in-memory data structures;
      accessing a manifest specifying binding between a network data definition format and ontology components of the base network ontology;
      identifying ontology components associated with the network data based on the manifest; and
      populating the identified ontology components with individuals and properties from the corresponding data structures;
   wherein the network data definition format comprises a selection from a group consisting of Structure of Management Information (SMI), YANG, and Extensible Markup Language (XML); and
   wherein the manifest comprises:
      mapping of at least one of SMI managed object, YANG leaf and XML element to a Web Ontology Language Description Logics (OWL-DL) class to which an individual belongs;
      mapping of at least one of SMI object hierarchy, YANG leafref and XML element hierarchy to an OWL-DL object property asserted over a pair of individuals;
      mapping of a value of at least one of SMI object, YANG leaf and XML element to an OWL-DL individual of a corresponding class; and
      asserting a data property on an individual.

9. The non-transitory tangible media of claim 8, wherein controlling and managing the network comprises:
   detecting inconsistency in network data based on rules specified in the base network ontology, wherein an appropriate action is triggered upon detecting the inconsistency;
   inferring logical consequences based on a set of asserted facts, wherein another appropriate action is triggered when an error is inferred; and
   verifying satisfiability of a concept for service composition and resource identification, wherein a report on degree of deviation between a request and current network state is generated if the concept's satisfiability is not verified.

10. The non-transitory tangible media of claim 8, wherein the operations further comprise performing machine reasoning over the network data in the network knowledge base using the semantic reasoner.

11. The non-transitory tangible media of claim 8, wherein the base network ontology of the network includes scope of the network, devices in the network, and individual protocols and features that run on the devices, wherein the base network ontology specifies concepts, relationship between concepts, data properties and individuals.

12. An apparatus in a computer network, comprising:
   a memory element for storing data; and
   a processor, wherein the processor executes instructions associated with the data, wherein the processor and the memory element cooperate, wherein the apparatus is configured for:
   generating a fully populated semantics model of the computer network from network data according to a base network ontology of the computer network, wherein the semantics model comprises a representation of the computer network in a framework of semantically related terms comprising properties of network features of components of the computer network;
   mapping the fully populated semantics model to a network knowledge base;
   feeding contents of the network knowledge base to a semantic reasoner; and
   controlling and managing the network using the semantic reasoner,
   wherein generating the fully populated semantics model of the network comprises:
      receiving the network data from the network;
      parsing the network data;
      loading the parsed network data into in-memory data structures;
      accessing a manifest specifying binding between a network data definition format and ontology components of the base network ontology;
      identifying ontology components associated with the network data based on the manifest; and
      populating the identified ontology components with individuals and properties from the corresponding data structures;
   wherein the network data definition format comprises a selection from a group consisting of Structure of Management Information (SMI), YANG, and Extensible Markup Language (XML); and wherein the manifest comprises:

mapping of at least one of SMI managed object, YANG leaf and XML element to a Web Ontology Language Description Logics (OWL-DL) class to which an individual belongs;

mapping of at least one of SMI object hierarchy, YANG leafref and XML element hierarchy to an OWL-DL object property asserted over a pair of individuals;

mapping of a value of at least one of SMI object, YANG leaf and XML element to an OWL-DL individual of a corresponding class; and asserting a data property on an individual.

13. The apparatus of claim 12, wherein controlling and managing the network comprises:

detecting inconsistency in network data based on rules specified in the base network ontology, wherein an appropriate action is triggered upon detecting the inconsistency;

inferring logical consequences based on a set of asserted facts, wherein another appropriate action is triggered when an error is inferred; and verifying satisfiability of a concept for service composition and resource identification, wherein a report on degree of deviation between a request and current network state is generated if the concept's satisfiability is not verified.

14. The apparatus of claim 12, further configured for performing machine reasoning over the network data in the network knowledge base using the semantic reasoner.

15. The apparatus of claim 12, wherein the base network ontology of the network includes scope of the network, devices in the network, and individual protocols and features that run on the devices, wherein the base network ontology specifies concepts, relationship between concepts, data properties and individuals.

* * * * *